(12) United States Patent
Abusleme et al.

(10) Patent No.: US 7,262,226 B2
(45) Date of Patent: Aug. 28, 2007

(54) CTFE-BASED THERMOPROCESSABLE COMPOSITIONS

(75) Inventors: Julio A. Abusleme, Varese (IT); Claudia Manzoni, Bologna (IT); Mattia Bassi, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/814,339

(22) Filed: Apr. 1, 2004

(65) Prior Publication Data
US 2004/0198894 A1 Oct. 7, 2004

(30) Foreign Application Priority Data
Apr. 1, 2003 (IT) .......................... MI2003A0642

(51) Int. Cl.
*C08J 9/00* (2006.01)
*C08F 259/08* (2006.01)

(52) U.S. Cl. .................. 521/98; 521/134; 521/142; 526/249; 528/397; 525/199

(58) Field of Classification Search ................ 521/50, 521/98, 134, 142; 526/249; 528/397; 525/199
See application file for complete search history.

(56) References Cited

U.S. PATENT DOCUMENTS

| | | | |
|---|---|---|---|
| 4,025,709 A | 5/1977 | Blalse et al. | |
| 4,304,713 A * | 12/1981 | Perelman | 264/45.9 |
| 4,360,652 A | 11/1982 | Dohany | |
| 4,513,129 A | 4/1985 | Nakagawa et al. | |
| 4,789,717 A | 12/1988 | Giannetti et al. | |
| 4,864,006 A | 9/1989 | Giannetti et al. | |
| 5,021,516 A | 6/1991 | Wheland | |
| 5,468,782 A | 11/1995 | Mehan | |
| 5,498,680 A | 3/1996 | Abusleme et al. | |
| 5,569,728 A | 10/1996 | Abusleme et al. | |
| 5,614,319 A | 3/1997 | Wessels et al. | |
| 5,688,457 A * | 11/1997 | Buckmaster et al. | 264/211 |
| 6,107,393 A * | 8/2000 | Abusleme et al. | 524/545 |
| 6,329,481 B1 | 12/2001 | Abusleme et al. | |
| 2001/0003124 A1* | 6/2001 | Zolotnitsky et al. | 524/401 |

FOREIGN PATENT DOCUMENTS

| | | |
|---|---|---|
| EP | 0 185 242 A2 | 12/1985 |
| EP | 0 186 215 A2 | 12/1985 |
| EP | 1 067 146 A1 | 6/2000 |
| EP | 1 130 056 A2 | 9/2001 |

OTHER PUBLICATIONS

Encyclopedia of Polymer Science and Engineering, Additives, John Wiley and Sons, online article, Mar. 2002.*

* cited by examiner

*Primary Examiner*—Irina S Zemel
(74) *Attorney, Agent, or Firm*—Arent Fox, LLP.

(57) ABSTRACT

A thermoprocessable polymeric composition formed by ethylene/chlorotrifluoroethylene copolymers containing from 0.5 to 20% by moles of ethylene, optionally in combination with the chlorotrifluoroethylene homopolymer, wherein the composition contains in total from 90 to 99.5% by moles of chlorotrifluoroethylene and from 0.5-10% by moles of ethylene; said polymeric composition having a second melting temperature ($T_{mII}$) higher than 185° C., preferably higher than 200° C.

17 Claims, No Drawings

CTFE-BASED THERMOPROCESSABLE COMPOSITIONS

The present invention relates to a thermoprocessable chlorotrifluoroethylene (CTFE) based polymeric composition containing at least 90% by moles of CTFE, having in combination good mechanical and electrical properties useful in particular in the electrical cable coating.

More specifically said composition, besides the combination of good mechanical and electrical properties, shows a second melting temperature higher than 185° C. and is therefore usable to obtain manufactured articles structurally stable up to a temperature of 160° C.

It is known in the prior art that the CTFE homopolymer (PCTFE) is a fluorinated resin having a very good chemical resistance with good impermeability properties to gases and vapours and good electrical insulation properties. However it shows mechanical properties typical of a brittle material, i.e. a high elastic modulus value and a poor elongation at break, in particular after having been subjected to thermal ageing at temperatures higher than 100° C.

As known the high viscosity CTFE homopolymers, i.e. low Melt Flow Index (MI) and high molecular weight, show mechanical properties better than those having a low viscosity, i.e. high Melt Flow Index and low molecular weight. However the PCTFE having a very high viscosity is hardly processable in the equipments used for obtaining molded articles as pipes, plaques, films and electrical cable coatings.

The need was felt to have available a thermoprocessable CTFE polymer having the following combination of properties:

good mechanical properties, in particular a high elongation at break, even after thermal ageing at temperatures higher than 100° C.;

good electrical insulation properties, in particular low tan δ values;

possibility to give manufactured articles structurally stable up to a temperature of 160° C.

The Applicant has unexpectedly and surprisingly found CTFE-based thermoprocessable polymeric compositions allowing to solve the above technical problem.

An object of the present invention is therefore a thermoprocessable polymeric composition comprising ethylene/chlorotrifluoroethylene copolymers E/CTFE containing from 0.5 to 20% by moles of E, optionally in combination with the CTFE homopolymer, wherein the composition contains in total from 90 to 99.5% by moles of chlorotrifluoroethylene (CTFE) and from 0.5 to 10% by moles of ethylene (E); said polymeric composition having a second melting temperature ($T_{mII}$) higher than 185° C., preferably higher than 200° C.

The invention composition preferably contains in total from 1 to 6% by moles of ethylene, more preferably from 1 to 5% by moles.

The invention composition has preferably a Melt Flow Index (MI) higher than 0.5 g/10', more preferably higher than 2.0 g/10'.

The copolymerization of ethylene with CTFE can be carried out in suspension in an organic medium or in water or in aqueous emulsion, in the presence of a radical initiator, at a temperature generally comprised between −20° C. and 150° C., preferably between 0° C. and 100° C., more preferably between 10° C. and 70° C. The reaction pressure is generally in the range 1.5-80 bar, preferably 3-37 bar, still more preferably 4-26 bar.

As radical initiators it can for example be used:

i) bis-acylperoxides of formula $(R_f\!-\!CO\!-\!O)_2$, wherein $R_f$ is a $C_1$-$C_{10}$ (per)haloalkyl (see for example patents EP 185,242 and U.S. Pat. No. 4,513,129), or a perfluoropolyoxyalkylene group (see for example patents EP 186,215 and U.S. Pat. No. 5,021,516); among them, bis-trichloroacetylperoxide and bis-dichloro-fluoroacetylperoxide are particularly preferred (see U.S. Pat. No. 5,569,728);

ii) water-soluble inorganic peroxides, as monovalent cation persulphates or perphosphates; the sodium and potassium persulphates are particularly preferred;

iii) organic or inorganic redox systems, as potassium persulphate/sodium sulphite, terbutylhydroperoxide/metabisulphite.

The suspension copolymerization can be carried out, optionally by using solvents for the monomers, optionally by using water to favour the dispersion of the reaction heat. As organic solvents, chlorofluorocarbons, as $CCl_2F_2$ (CFC-12), $CCl_3F$ (CFC-11), $CCl_2FCClF_2$ (CFC-113), $CClF_2CClF_2$ (CFC-114), or hydrofluorocarbons, optionally containing oxygen, can be used. In particular fluoropolyethers having at least one, preferably two hydrogenated end groups of the $-CF_2H$, $-CF_2CF_2H$, $-CF(CF_3)H$ type can be used. The radical initiator amount is comprised between 0.003% and 10% by weight with respect to the total monomer amount.

The emulsion copolymerization is carried out in the presence of fluorinated surfactants as those described, for example, in U.S. Pat. No. 4,360,652 and U.S. Pat. No. 4,025,709. Said fluorinated surfactants have general formula

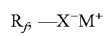

$$R_f\!-\!X^-M^+$$

wherein $R_f$ is a $C_5$-$C_{14}$ (per) fluoroalkyl chain or a (per) fluoropolyoxyalkylene chain, $X^-$ is $-COO^-$ or $-SO_3^-$, $M^+$ is selected from: $H^+$ and one alkaline metal ion, preferably $K^+$ or $Na^+$. The Example of said surfactants are: sodium perfluorooctanoate; (per)fluoropolyoxyalkylenes ended with one or more carboxylic groups; sulphonic acid salts of formula $R_f\!-\!C_2H_4SO_3H$, wherein $R_f$ is a $C_4$-$C_{10}$ perfluoroalkyl (see U.S. Pat. No. 4,025,709).

A copolymer having a low molecular weight (high Melt Flow Index MI) is preferable obtained by using a high synthesis temperature (60° C.-80° C.) combined with a high concentration of free radicals deriving from the initiator.

It is also possible to use chain transfer agents to obtain low molecular weights, for example halogenated hydrocarbons, as chloroform or HCFC-123 or ethane or methane in amounts between 0.001 and 5% by weight, referred to the initial monomers.

The copolymerization process can be carried out in the presence of dispersions, emulsions or microemulsions of perfluoropolyoxyalkylenes, according to U.S. Pat. No. 4,789,717 and U.S. Pat. No. 4,864,006, or also of fluoropolyoxyalkylene microemulsions according to U.S. Pat. No. 5,498,680.

The process for the preparation of the invention copolymers is preferably carried out in the presence of a (per)fluoropolyoxyalkylenes microemulsion containing as surfactant a $Na^+$ or $K^+$ salt of sulphonic or carboxylic derivatives of perfluoroalkyls or perfluoropolyoxyalkylenes and of a radical initiator as sodium or potassium persulphate.

The invention composition, containing a total amount of ethylene higher than 5% by moles, is prepared by emulsion polymerization by first charging the reactor with all the CTFE and continuously feeding ethylene (E) until a prefixed partial CTFE conversion, preferably until reaching a CTFE conversion from 40 to 80% by weight, then by stopping the ethylene feeding and continuing the polymerization up to a substantial CTFE conversion. A polymeric E-rich E/CTFE fraction and a polymeric E/CTFE fraction having a low E content, are thus obtained. The composition formed by the two fractions has, at equal content of E, a second melting temperature higher than that of the copolymer having in all the polymeric chains the same ethylene content.

Alternatively the polymeric composition containing a total amount of ethylene higher than 5% by moles can be obtained by first charging all the CTFE and polymerizing the CTFE up to a prefixed CTFE partial conversion, preferably to a conversion from 20 to 60% by weight; then continuously feeding the ethylene up to a substantial conversion of the remaining CTFE.

Another method to prepare the composition containing an ethylene total amount higher than 5% by moles consists in mixing the polymeric latexes or the powders of the two above polymeric fractions, separately prepared.

The invention composition, containing an ethylene total amount lower than 5% by moles (from 0.5 to less than 5% by moles), can be prepared with the above processes used to obtain copolymers containing an amount of ethylene higher than 5% by moles. Another process to prepare these polymers wherein the chains have the same ethylene content, lower than 5%, can be carried out by polymerization of the two monomers wherein CTFE is first charged and then ethylene is continuously fed.

The Applicant has furthermore unxpectedly and surprisingly found that the invention compositions foam in extrusion without using foaming agents or inert gases but by mere addition of nucleating agents.

Another object of the present invention are foamable compostions consisting essentially of:
A) 50-99.9% by weight, preferably 70-95%, of the above thermoprocessable polymeric composition, formed by E/CTFE copolymers containing from 0.5 to 20% by moles of E, optionally in combination with CTFE homopolymer, wherein the composition contains in total from 90 to 99.5% by moles of chlorotrifluoroethylene (CTFE) and from 0.5 to 10% by moles of ethylene (E); said polymeric composition having a second melting temperature ($T_{mII}$) higher than 185° C., preferably higher than 200° C.;
B) 0.1-50% by weight of a nucleating agent, in fine powder, having an average particle size lower than 50 micron, preferably lower than 20 micron, and melting temperatures higher than 250° C.

The nucleating agents are preferably used in amounts from 5 to 30% by weight, more preferably from 10 to 20%.

The preferred nucleating agent is the tetrafluoroethylene homopolymer (PTFE) or its copolymers having a second melting temperature higher than 250° C.

Examples of tetrafluoroethylene (TFE) copolymers are TFE copolymers with perfluoroalkylvinylethers wherein the alkyl is a $C_1$-$C_3$ (for example the commercial products Hyflon® MFA and PFA), TFE copolymers with perfluorodioxoles, or TFE copolymers with hexafluoropropene (FEP), optionally containing perfluoroalkylvinylethers.

More preferably as nucleating agent B) the tetrafluoroethylene homopolymer (PTFE) is used having a number average molecular weight lower than 1,000,000, preferably lower than 500,000. Said PTFE can be obtained by irradiating with gamma rays or electron beam PTFE powders obtained by dispersion or suspension polymerization processes and then milling said irradiated powders.

With the dispersion polymerization processes latexes having a particle size of 0.1-0.3 micron are obtained. After coagulation the powder particle sizes increase to about 100-500 micron. Said powders are irradiated with gamma rays and then milled to obtain powders having final particle sizes lower than 15 micron (commercial product PTFE Algoflon® L 206 and Algoflon® L 203).

With the suspension polymerization processes, powders having particle sizes of 2-5 mm are obtained. Said powders are irradiated with electron beam and then milled to obtain powders having a final particle size lower than 15 micron.

The number average molecular weight of the irradiated PTFE has values lower than 1,000,000, generally lower than 500,000 and is calculated by the total amount $N_g$ (expressed in moles/kg) of the PTFE end groups —$CF_2COOH$ and —$CF_2COF$, determined by FT-IR spectroscopy. The number average molecular weight ($M_n$) is calculated by means of the following formula $M_n=2000/N_g$.

Other nucleating agents which can be used according to the invention are for example boron nitride, silicon nitride, silica, alumina, talc, zinc sulphide.

The foamable invention compositions can also contain known additives of the prior art for foamable compositions such as thermal stabilizers, UV stabilizers, pigments, flame retardants, reinforcing agents.

By thermomolding or extrusion of the foamable compositions A)+B), foamed molded articles and in particular foamed coatings of electric cables are obtained.

The following Examples are given for illustrative and not limitative purposes of the present invention.

EXAMPLES

Characterization

The following characterizations carried out on the materials of the Examples are indicated hereinafter:

Melt Flow Index (M.I.)

The M.I. of the fluorinated polymers is measured according to the ASTM D 1238 method with a 10 kg load.

Second melting ($T_{mII}$) and crystallization $T_{xx}$) temperature

The $T_{mII}$ and the $T_{xx}$ of the fluorinated polymers are determined by differential scanning calorimetry (DSC) at a scanning rate equal to 10° C./min.

Void %

It has been calculated by means of the following equation:

Void %=100*($\varrho c$-$\varrho m$)/$\varrho c$ wherein:

$\varrho c$=calculated density of the composition A)+B) obtained by the weight average of the measured densities of A) and B);

$\varrho m$=density of the extruded specimen determined according to the ASTM D 792 method.

Mechanical properties

The mechanical properties have been obtained according to the ASTM D 1708 method at 23° C. by using compression molded specimens.

Loss Factor (tan δ)

The tan δ is defined as the ratio between the real part and the imaginary part of the dielectric constant at the defined frequency. The tan δ for frequencies around 100 MHz has been determined by the resonance curve analysis in a cylindrical cavity of suitable sizes. In particular tan δ has been determined as the inverse of the quality factor Q, defined by the f/Δf ratio, wherein f is the resonance frequency and Δf is the resonance peak width at half power. The instrumental factor is eliminated by substracting the contribution in parallel of the cavity. in vacuum $Q_0$ according to the relation $1/Q=1/Q_{exp}-1/Q_0$.

Ethylene content, mol %

The ethylene content has been determined by FT-IR analysis after suitable calibration carried out by using some reference polymer specimens of which the % by moles of ethylene is known, determined by carbon elemental analysis.

Example 1

In an enamelled autoclave equipped with enamelled baffles and stirrer working at 300 rpm were introduced in sequence:

8.2 l of demineralized water;
112.5 g of a microemulsion formed by:
20% by weight of Galden® D02 having formula

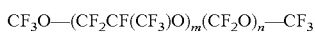
$CF_3O-(CF_2CF(CF_3)O)_m(CF_2O)_n-CF_3$ with m/n=20 and number average molecular weight of 450;
40% by weight of a surfactant of formula

$(C_3ClF_6O)-(CF_2-CF(CF_3)O)_{m1}-(CF_2O)_{n1}-CF_2COO^-K^+$ with m1/n1=82.7 and number average molecular weight of 527;
40% by weight of $H_2O$;
4 kg of chlorotrifluoroethylene.

The autoclave was brought to the reaction temperature of 50° C. obtaining a pressure of 12.8 bar. Then it was started to feed ethylene with a flow-rate of 25 g/hour and 19 g of potassium persulphate dissolved in 800 g of demineralized water were introduced.

The ethylene feeding was continued for 2 hours, then it was stopped and the polymerization reaction continued until obtaining a pressure decrease of 3 bar with respect to that initial. The total reaction lasted 270 minutes.

The latex discharged from the autoclave was diluted with demineralized water up to a concentration of 195.7 g of polymer per kg of latex.

From the latex the polymer was precipitated by cooling at the temperature of −20° C., then separated and dried at 150° C. for 16 hours obtaining 3.5 kg of product.

The percentage by moles of ethylene in the polymer, the M.I., the second melting temperature ($T_{mII}$), the crystallization temperature ($T_{xx}$), and the mechanical properties measured both before and after the thermal treatment at 160° C. for 7 days, are reported in Table 1.

Example 2

The Example 1 was repeated, except that ethylene was fed with a flow rate of 15 g/hour. The total reaction lasted 346 minutes.

The latex discharged from the autoclave was diluted with demineralized water to a concentration of 201.1 g of polymer for kg of latex which is treated as in the Example 1 to obtain the product.

The percentage by moles of ethylene in the polymer, the M.I., the second melting temperature ($T_{mII}$), the crystallization temperature ($T_{xx}$), and the mechanical properties measured both before and after the thermal treatment at 160° C. for 7 days, are reported in Table 1.

Example 3 (Comparative)

The PCTFE homopolymer latex was prepared according to patent EP-A-1,067,146.

In an enamelled autoclave equipped with enamelled baffles and stirrer working at 300 rpm were introduced in sequence:

6.5 l of demineralized water;
225 g of a microemulsion formed by:
20% by weight of Galden® D02 having formula

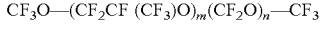
$CF_3O-(CF_2CF(CF_3)O)_m(CF_2O)_n-CF_3$ with m/n=20 and number average molecular weight of 450;
40% by weight of a surfactant of formula

$(C_3ClF_6O)-(CF_2-CF(CF_3)O)_{m1}-(CF_2O)_{n1}-CF_2COO^-K^+$ with m1/n1=82.7 and number average molecular weight of 527;
40% by weight of $H_2O$;
4 kg of chlorotrifluoroethylene.

The autoclave was then brought to the reaction temperature of 40° C. obtaining a pressure of 9.8 bar. Then 64 g of potassium persulphate dissolved in 2.5 l of demineralized water were introduced.

The polymerization was continued until obtaining a pressure decrease of 4 bar with respect to its initial value. The total reaction lasted 690 minutes.

The latex has a concentration of 260.9 g of polymer per kg of latex.

From the latex the polymer was precipitated by cooling at the temperature of −20° C., then separated and dried at 175° C. for 16 hours.

The M.I., the second melting temperature ($T_{mII}$), the crystallization temperature ($T_{xx}$), and the mechanical properties measured both before and after the thermal treatment at 160° C. for 7 days are reported in Table 1.

Example 4

In an enamelled autoclave equipped with enamelled baffles and stirrer working at 300 rpm were introduced in sequence:

8.2 l of demineralized water;
112.5 g of a microemulsion formed by:
20% by weight of Galden® D02 having formula

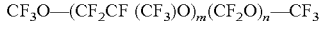
$CF_3O-(CF_2CF(CF_3)O)_m(CF_2O)_n-CF_3$ with m/n=20 and number average molecular weight of 450;
40% by weight of a surfactant of formula

$(C_3ClF_6O)-(CF_2-CF(CF_3)O)_{m1}-(CF_2O)_{n1}-CF_2COO^-K^+$ with m1/n1=82.7 and number average molecular weight of 527;
40% by weight of $H_2O$;
20 g of chloroform;
4 kg of chlorotrifluoroethylene.

The autoclave was then brought to the reaction temperature of 60° C. and 22 g of ethylene were introduced obtaining a pressure of 16.3 absolute bar. 19 g of potassium persulphate dissolved in 800 g of demineralized water were introduced in the autoclave.

The pressure was maintained constant for 75 minutes by continuously feeding ethylene in the reactor until a consumption of 40 g. At this point the ethylene feeding was stopped continuing the polymerization until obtaining a pressure decrease of 3 bar with respect to its initial value. The total reaction lasted 135 minutes. Then the autoclave was vented and discharged at room temperature.

The latex was diluted with demineralized water to a concentration of 213.4 g of polymer per kg of latex. The average diameter of the latex particles resulted of 68 nm.

From the latex the polymer was precipitated by cooling at the temperature of −20° C., then separated and dried at 120° C. for 16 hours.

The percentage by moles of ethylene in the polymer, the M.I., the second melting temperature ($T_{mII}$), the crystallization temperature ($T_{xx}$), and the mechanical properties both before and after the thermal treatment at 160° C. for 7 days, are reported in Table 1.

Example 5 (Comparative)

A PCTFE homopolymer was prepared according to the Example 9 of EP 1,067,148.

The mechanical properties, the M.I., the second melting temperature ($T_{mII}$), the crystallization temperature ($T_{xx}$) are reported in Table 1. The elastic modulus and the elongation at break after thermal treatment at 160° C. for 7 days were not measured due to the excessive brittleness of the material.

Example 6

The Example 1 was repeated, except that the reaction temperature was fixed at 60° C. obtaining a pressure of 16 bar. Then ethylene was fed with a flow rate of 50 g/hour per one hour. The total reaction lasted 150 minutes.

The latex was diluted with demineralized water to a concentration of 196.9 g of polymer for kg of latex. The average latex particle diameter is of 97 nm.

From the latex the polymer was precipitated by cooling at the temperature of −20° C., then separated and dried at 150° C. for 16 hours.

The percentage by moles of ethylene in the polymer, the M.I., the second melting temperature ($T_{mII}$), the crystallization temperature ($T_{xx}$), and the mechanical properties are reported in Table 2.

A part of the powder obtained from the latex was granulated in a conic twin-screw Brabender extruder (screw diameter ranging from 42.5 mm in the hopper to 28.5 mm at the head) made of corrosion-resistant steels as Hastelloy and Inconel. The three extruder heating zones were set, starting from the hopper, at 175° C., 230° C. and 250° C. The head temperature was set at 260° C. The extruder worked at 3 rpm with a pressure at the head of about 15 bar and a melt temperature of 260° C.

The obtained granules were extruded in the equipment for the M.I. determination at a temperature of 265° C. obtaining an extrudate.

The void % of the extrudate is reported in Table 4.

Example 7

The Example 6 was repeated, except that the ethylene was fed with a flow rate of 30 g/hour per one hour. The total reaction lasted 180 minutes.

The latex was diluted with demineralized water to a concentration of 180.9 g of polymer for kg of latex.

From the latex the polymer was precipitated by cooling at the temperature of −20° C., then separated and dried at 150° C. for 16 hours.

The percentage by moles of ethylene in the polymer, the M.I., the second melting temperature ($T_{mII}$), the crystallization temperature ($T_{xx}$), and the mechanical properties are reported in Table 2.

Example 8 (Comparative)

The M.I., the second melting temperature ($T_{mII}$), the crystallization temperature ($T_{xx}$), and the mechanical properties of a PCTFE homopolymer prepared as in the Example 8 of EP 1,067,148, are reported in Table 2.

Example 9

In an enamelled autoclave equipped with enamelled baffles and stirrer working at 300 rpm were introduced in sequence:

8.2 l of demineralized water;

112.5 g of a microemulsion formed by:

20% by weight of Galden® D02 having formula

with m/n=20 and number average molecular weight of 450;

40% by weight of a surfactant of formula

with m1/n1=82.7 and number average molecular weight of 527;

40% by weight of $H_2O$;

20 g of chloroform;

4 kg of chlorotrifluoroethylene.

The autoclave was brought to the reaction temperature of 60° C. obtaining a pressure of 16.3 bar. Then it was started to feed ethylene with a flow rate of 12 g/hour and 19 g of potassium persulphate dissolved in 800 g of demineralized water were introduced.

The ethylene feeding was continued for the whole polymerization until obtaining a pressure decrease of 3 bar with respect to its initial value. The total reaction lasted 180 minutes.

The latex was diluted with demineralized water to a concentration of 170.1 g of polymer per kg of latex. The average diameter of the latex particles is 78 nm.

From the latex the polymer was precipitated by cooling at the temperature of −20° C., then separated and dried at 120° C. for 16 hours.

The percentage by moles of ethylene in the polymer was of 2.6% by moles, the M.I. was equal to 13.6 g/10', the second melting temperature ($T_{mII}$) was 195.0° C., the crystallization temperature ($T_{xx}$) was 158.2° C. and the elongation at break was 143%.

Example 10 (Comparative)

The Example 9 was repeated, except that chloroform was not charged and that the ethylene was fed with a flow rate of 24 g/hour.

After 150 reaction minutes the working pressure decreased of 3 bar with respect to its initial value, then the autoclave was vented and discharged at room temperature.

The obtained latex had a concentration of 279.4 g of polymer per kg of latex.

From two litres of latex the polymer was precipitated by cooling at the temperature of −20° C., then separated and dried at 120° C., for 16 hours.

The so obtained powder was granulated under the same conditions of the Example 6.

The percentage by moles of ethylene in the polymer, the M.I., the second melting temperature ($T_{mII}$), the crystallization temperature ($T_{xx}$), and the measured mechanical properties are reported in Table 3.

Example 11 (Comparative)

A PCTFE homopolymer latex was prepared according to patent EP-A-1,067,146.

In an enamelled autoclave equipped with enamelled baffles and stirrer working at 300 rpm were introduced in sequence:

8.2 l of demineralized water;

90 g of a microemulsion formed by:

20% by weight of Galden® D02 having formula

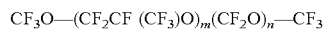

with m/n=20 and number average molecular weight of 450;

40% by weight of a surfactant of formula

with m1/n1=82.7 and number average molecular weight of 527;

40% by weight of $H_2O$;

4 kg of chlorotrifluoroethylene.

The autoclave was then brought to the reaction temperature of 50° C. obtaining a pressure of 12 bar. Then 19 g of potassium persulphate dissolved in 800 g of demineralized water were charged.

The polymerization was continued until obtaining a pressure decrease of 3 bar with respect to its initial value. The total reaction lasted 645 minutes.

The obtained latex has a concentration of 265.9 g of polymer per kg of latex.

From two litres of latex the polymer was precipitated by cooling at the temperature of −20° C., then separated and dried at 120° C. for 16 hours. The so obtained powder was granulated as in the Example 6.

The M.I., the second melting temperature ($T_{mII}$), the crystallization temperature ($T_{xx}$) and the mechanical properties are reported in Table 3.

Example 12

0.5 kg of the latex prepared in the Example 10 were mixed with 1.5 kg of the latex prepared in the Example 11.

From the obtained mixture the polymer was precipitated by cooling at the temperature of −20° C. Then the product was separated and dried at 120° C. for 16 hours. The so obtained powder was granulated as in the Example 6.

The percentage by moles of ethylene in the polymer, the M.I., the second melting temperature ($T_{mII}$), the crystallization temperature ($T_{xx}$), and the mechanical properties are reported in Table 3.

Example 13

1 kg of the latex prepared in the Example 10 was mixed with 1 kg of the latex prepared in the Example 11.

From the obtained mixture the polymer was precipitated by cooling at the temperature of −20° C. Then the product was separated and dried at 120° C. for 16 hours. The so obtained powder was granulated as in the Example 6.

The percentage by moles of ethylene in the polymer, the M.I., the second melting temperature ($T_{mII}$), the crystallization temperature ($T_{xx}$), and the mechanical properties are reported in Table 3.

Example 14

1.5 kg of the latex prepared in the Example 10 were mixed with 0.5 kg of the latex prepared in the Example 11.

From the obtained mixture the polymer was precipitated by cooling at the temperature of −20° C. Then the product was separated and dried at 120° C. for 16 hours. The so obtained powder was granulated as in the Example 6.

The percentage by moles of ethylene in the polymer, the M.I., the second melting temperature ($T_{mII}$), the crystallization temperature ($T_{xx}$), and the mechanical properties are reported in Table 3.

Example 15

285 g of the product in powder obtained in the Example 6 were mixed with 15 g of a TFE homopolymer (PTFE) obtained by suspension polymerization and subjected to irradiation with electron beam and subsequent milling, having a number molecular weight of 100,000 and an average particle size of 10 micron, commercially available as POLYMIST F5A by Solvay Solexis formerly Ausimont S.p.A.

The dry blend was granulated as in the Example 6. The obtained granules were extruded in the equipment for the M.I. measurement at a temperature of 265° C. obtaining an extrudate.

The void % of the extrudate is reported in Table 4.

Example 16

240 g of the product in powder obtained in the Example 6 were mixed with 60 g of the same PTFE used in the Example 15. The blend was granulated and then extruded as in the Example 15.

The void % of the extrudate is reported in Table 4.

Example 17

Determination of Electrical Properties

The tan δ was measured at 100 MHz of the following polymers:

A) the copolymers of the Examples 1, 4, 14;
B) the PCTFE homopolymer of the Example 5 (comparative);
C) an E/CTFE copolymer containing an equimolar amount of E and CTFE, marketed with the name of Halar 500® by Solvay Solexis formerly Ausimont S.p.A.;
D) an E/CTFE copolymer containing 57% by moles of CTFE and 43% by moles of ethylene.

The measurements were carried out on compression molded specimens having a thickness of about 0.5 mm.

The specimen tan δ is reported in Table 5.

TABLE 1

| Example No. | 1 | 2 | 3 (comp) | 4 | 5 (comp) |
|---|---|---|---|---|---|
| Ethylene (% by moles) | 3.8 | 2.3 | — | 5.7 | — |
| MI (g/10') | 0.7 | 1.3 | 1.0 | 10.5 | 7.7 |
| $T_{mII}$ (° C.) | 209.2 | 210.6 | 214.8 | 205.9 | 213.3 |
| $T_{xx}$ (° C.) | 166.6 | 172.7 | 183.0 | 157.3 | 177.9 |
| Mechanical properties at 23° C. | | | | | |
| Elastic Modulus (MPa) | 1128 | 1155 | 1206 | 1320 | 1331 |
| Yield stress (MPa) | 33.6 | 37.5 | 44.6 | 32 | 45.1 |
| Yield strain (%) | 6 | 6.5 | 6.5 | 5 | — |
| Stress at break (MPa) | 37.9 | 39.8 | 44.6 | 24 | 24.8 |
| Elongation at break (%) | 171 | 189 | 148 | 165 | 40 |
| After thermal aging (160° C. for 7 days) | | | | | |
| Elastic Modulus (MPa) | 1162 | 1394 | 1601 | 1284 | brittle |
| Yield stress (MPa) | 36.8 | 41.3 | 50.8 | 3 | not punchable |
| Yield strain (%) | 5 | 5 | 5 | 5 | — |
| Stress at break (MPa) | 40 | 41.5 | 51 | 27 | — |
| Elongation at break (%) | 160 | 197 | 28 | 125 | — |

TABLE 2

| Example No. | 6 | 7 | 8 (comp) |
|---|---|---|---|
| Ethylene (% by moles) | 3.8 | 2.1 | — |
| MI (g/10') | 4.6 | 3.2 | 3.4 |
| $T_{mII}$ (° C.) | 209.2 | 210.1 | 213.4 |
| $T_{xx}$ (° C.) | 169.9 | 173.6 | 170.5 |
| Mechanical properties at 23° C. | | | |
| Elastic Modulus (MPa) | 1095 | 1193 | 1550 |
| Yield stress (MPa) | 36.4 | 39.5 | 43.8 |
| Yield strain (%) | 5.5 | 6 | — |
| Stress at break (MPa) | 36.4 | 39.6 | 29.2 |
| Elongation at break (%) | 216 | 149 | 65.3 |

TABLE 3

| Example No. | 10 (comp) | 12 | 13 | 14 | 11 (comp) |
|---|---|---|---|---|---|
| Ethylene (% by moles) | 5.1 | 1.3 | 2.6 | 3.8 | — |
| MI (g/10') | 22.9 | 15.6 | 19.4 | 18.2 | 13.3 |
| $T_{mII}$ (° C.) | 179.8 | 212.0 | 211.5 | 210.6 | 213.4 |
| $T_{xx}$ (° C.) | 145.0 | 182.0 | 173.2 | 167.6 | 182.0 |
| Mechanical properties at 23° C. | | | | | |
| Elastic Modulus (MPa) | 1,104 | 1,295 | 1,203 | 1,280 | 1,343 |
| Yield stress (MPa) | 34.5 | 43 | 39.7 | 39.3 | 46.8 |
| Yield strain (%) | 6 | 6 | 6 | 6 | 6 |
| Stress at break (MPa) | 34.5 | 43 | 39.9 | 39.5 | 47 |
| Elongation at break (%) | 161 | 186 | 188 | 191 | 67 |

TABLE 4

| | Mixture composition (% by weight) | | |
|---|---|---|---|
| Example No. | Copolymer A | Nucleating Agent B | Void % |
| 6 | 100 | — | 0 |
| 15 | 95 | 5 | 28.0 |
| 16 | 80 | 20 | 36.5 |

TABLE 5

| | Polymer molar composition | | Specimen | | |
|---|---|---|---|---|---|
| Example No. | E (% mol.) | CTFE (% mol.) | thickness (mm) | Frequency (MHz) | tanδ *10$^{+4}$ |
| 1 | 3.8 | 96.2 | 0.51 | 115.0 | 51.0 |
| 4 | 5.7 | 94.3 | 0.48 | 101.1 | 57.1 |
| 14 | 3.8 | 96.2 | 0.50 | 112.0 | 57.0 |
| 5 (comp) | — | 100 | 0.52 | 114.6 | 38.0 |
| E/CTFE | 43 | 57 | 0.59 | 113.7 | 91.1 |
| Halar 500$^R$ | 50 | 50 | 0.52 | 113.6 | 93.3 |

The invention claimed is:

1. A thermoprocessable polymeric composition comprising ECTFE ethylene/chlorotrifluoroethylene copolymers consisting of ethylene and chlorotrifluoroethylene monomers and containing from 0.5 to 20% by moles of ethylene, optionally in combination with the chlorotrifluoroethylene homopolymer, wherein the composition contains in total from 90 to 99.5% by moles of chlorotrifluoroethylene and from 0.5 to 10% by moles of ethylene; said polymeric composition having a second melting temperature (TmII) higher than 185° C.

2. A composition according to claim 1, containing in total from 1 to 6% by moles of ethylene.

3. A composition according to claim 1, having a Melt Flow Index (M.I.) higher than 0.5 g 10'.

4. Compositions according to claim 1, comprising a nucleating agent.

5. Compositions of claim 4 consisting essentially of:
   A) 50-99.9% by weight, preferably 70-95%, of the thermoprocessable polymeric composition;
   B) 0.1-50% by weight of a nucleating agent, in the form of fine powder, having an average particle size lower than 50 micron, and a melting temperature higher than 250° C.;
   wherein said compositions are foamable.

6. Compositions according to claim 4, wherein the nucleating agent is selected from the group consisting of tetrafluoroethylene homopolymer (PTFE) or its copolymers having second melting temperatures higher than 250° C.

7. Compositions according to claim 5, wherein the nucleating agent B) is the tetrafluoroethylene homopolymer (PTFE) having a number average molecular weight lower than 1,000,000.

8. Compositions according to claim 6, wherein the TFE copolymers are selected from the TFE copolymers with perfluoroalkylvinylethers wherein the alkyl is a C1-C3, TFE copolymers with perfluorodioxoles, or TFE copolymers with hexafluoropropene (FEP), optionally containing perfluoroalkylvinylethers from 1 to 3 carbon atoms.

9. Compositions according to claim 5, wherein the nucleating agent B) is a polytetrafluoroethylene (PTFE) irradiated with gamma rays or electron beam.

10. Compositions according to claims 4-9, wherein the nucleating agent is used in an amount from 5 to 30% by weight.

11. Foamed molded articles and foamed coatings of electrical cables comprising the compositions according to claim 4.

12. A process to prepare the composition according to claim 1 by emulsion copolymerization of ethylene with chlorotrifluorethylene (CTFE) comprising firstly charging all the CTFE in the reactor, continuously feeding the ethylene until a partial CTFE conversion, then interrupting the ethylene feeding and continuing the polymerization until a substantial CTFE conversion.

13. The thermoprocessable polymeric composition of claim 1 wherein said polymeric composition has a second melting temperature (TmII) higher than 200° C.

14. The composition of claim 2, containing in total from 1 to 6% by moles of ethylene.

15. The composition according to claim 3, having a Melt Flow Index (M.I.) measured according ASTH D1238 with a 10 kg load higher than 2.0 g/10'.

16. Foamable compositions according to claim 7, wherein the nucleating agent B) is the tetrafluoroethylene homopolymer (PTFE) having a number average molecular weight lower than 500,000.

17. Compositions according to claim 10, wherein the nucleating agent is used in an amount from 10 to 20% by weight.

* * * * *